United States Patent
Betzler et al.

(10) Patent No.: US 9,609,025 B1
(45) Date of Patent: Mar. 28, 2017

(54) PROTECTION OF SENSITIVE DATA FROM UNAUTHORIZED ACCESS

(71) Applicant: International Business Machines Corporation, Armonk, NY (US)

(72) Inventors: Boas Betzler, Magstadt (DE); Vinod S. Chavan, Tampa, FL (US); Ingo Dressler, Rauenberg (DE); Holger Karn, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,002

(22) Filed: Nov. 24, 2015

(51) Int. Cl.
*G06F 21/62* (2013.01)
*H04L 29/06* (2006.01)
*H04L 29/08* (2006.01)

(52) U.S. Cl.
CPC .......... *H04L 63/20* (2013.01); *G06F 21/6245* (2013.01); *H04L 63/02* (2013.01); *H04L 67/1097* (2013.01)

(58) Field of Classification Search
None
See application file for complete search history.

(56) References Cited

U.S. PATENT DOCUMENTS

| 8,108,913 B2 * | 1/2012 | Weber ...................... G06F 21/62 709/223 |
| 8,316,237 B1 * | 11/2012 | Felsher ................. H04L 9/0825 380/282 |

(Continued)

FOREIGN PATENT DOCUMENTS

| GB | 2509709 | 7/2014 |
| WO | WO2014132246 | 9/2014 |
| WO | WO2014162264 | 10/2014 |

OTHER PUBLICATIONS

Wan, "HASBE: A Hierarchical Attribute-Based Solution for Flexible and Scalable Access Control in Cloud Computing", 2012, IEEE Transactions on Information Forensics and Security, pp. 743-754.*

(Continued)

*Primary Examiner* — Benjamin Lanier
(74) *Attorney, Agent, or Firm* — Schmeiser, Olsen & Watts, LLP; Isaac Gooshaw

(57) ABSTRACT

A method and associated computing system. Data received by a computing environment includes a mixture of non-sensitive data and sensitive data along with related metadata indicative of a sensitivity of the sensitive data. The computing system includes the computing environment. An operation is performed on the sensitive data in the computing environment by: (a) determining that the data used for the operation are sensitive data, (b) intercepting the operation on the sensitive data, and (c) registering newly created sensitive data, as a result of the operation, with metadata indicating one or more addresses of the sensitive data. An external access to the sensitive data in the computing environment is intercepted. A compliance firewall rule is applied to the sensitive data intended to leave the computing environment. The compliance firewall rule defines an action to be applied to the sensitive data such that the sensitive data are protected against unauthorized access.

14 Claims, 6 Drawing Sheets

(56) References Cited

U.S. PATENT DOCUMENTS

| | | | | |
|---|---|---|---|---|
| 2009/0254970 | A1* | 10/2009 | Agarwal | H04L 63/1425 726/1 |
| 2010/0175136 | A1* | 7/2010 | Frumer | G06F 21/31 726/26 |
| 2012/0331283 | A1* | 12/2012 | Chandran | H04L 9/088 713/150 |
| 2013/0091568 | A1* | 4/2013 | Sharif | G06F 21/50 726/22 |
| 2013/0124292 | A1* | 5/2013 | Juthani | G06F 21/41 705/14.26 |
| 2013/0152158 | A1* | 6/2013 | Yoshihama | G06F 21/6245 726/1 |
| 2014/0122867 | A1 | 5/2014 | Shrinivasan et al. | |
| 2014/0201804 | A1* | 7/2014 | Uthmani | G06F 21/60 726/1 |
| 2014/0325684 | A1* | 10/2014 | Takeyasu | H04L 63/20 726/29 |

OTHER PUBLICATIONS

Kandasamy, "Flexible Access Control for Outsourcing Personal Health Services in Cloud Computing using Hierarchical Attribute Set Based Encryption", 2013, pp. 1-3.*

Chen et al., Data Security and Privacy Protection Issues in Cloud Computing, 2012 International Conference on Computer Science and Electronics Engineering, pp. 647-651.

Wang et al., Hierarchical Attribute-Based Encryption for Fine-Grained Access Control in Cloud Storage Services.

* cited by examiner

PROTECTION OF SENSITIVE DATA FROM UNAUTHORIZED ACCESS

TECHNICAL FIELD

The invention relates generally to a method for accessing sensitive data, and more specifically, to a method for securely accessing sensitive data in, e.g., a cloud computing center.

BACKGROUND

The success of public, private, and hybrid cloud computing environments and other virtualization solutions provoke new security challenges for IT (information technology) organizations: employees belonging to business units may purchase and access IT services "from the cloud", thereby bypassing the IT organization of the company. Sometimes this bypassing of the IT organization is called "Shadow IT". Cloud-based solutions are usually easy to acquire, easy and fast to deploy, and ready to be used instantly. Cloud-based solutions are therefore sometimes used in enterprises to bypass existing time-consuming procurement and security processes.

SUMMARY

A method and associated computing system and computer program product. Data is received by a first computing environment, wherein the data includes a mixture of non-sensitive data and sensitive data along with related metadata indicative of a sensitivity of the sensitive data, and wherein the computing system includes the first computing environment. An operation is performed on the sensitive data in the first computing environment by: (a) determining that the data used for the operation are sensitive data, (b) intercepting the operation on the sensitive data, and (c) registering newly created sensitive data, as a result of the operation, with metadata indicating one or more addresses of the sensitive data. An external access to the sensitive data in the first computing environment is intercepted by a compliance gateway, wherein a compliance firewall rule is applied to the sensitive data intended to leave the first computing environment, and wherein the compliance firewall rule defines an action to be applied to the sensitive data such that the sensitive data are protected against unauthorized access.

BRIEF DESCRIPTION OF THE DRAWINGS

Embodiments of the present invention will be described, by way of example only, and with reference to the following drawings.

DETAILED DESCRIPTION

Figure 1:
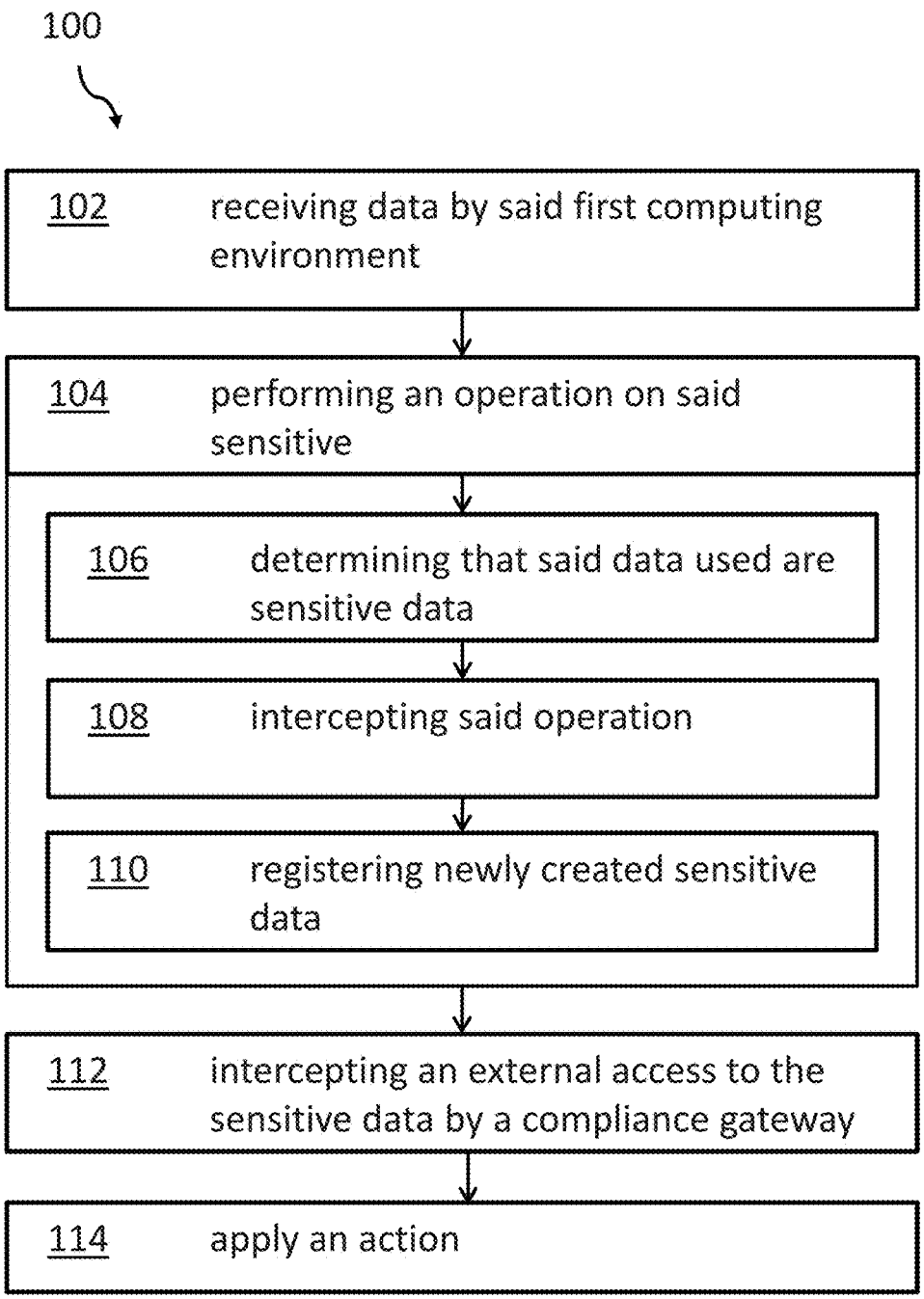
FIG. 1 is a flow chart of a method for securely accessing sensitive data stored in a computing environment, in accordance with embodiments of the present invention.

Cloud-based solutions are sometimes used in enterprises to bypass existing time-consuming procurement and security processes. Thus, an IT organization becomes vulnerable to data loss since no rules are enforced by security devices and/or processes as to how sensitive data should be handled. The information security officer may no longer know where sensitive data in the organization or of the organization resides. Nor are policies in place as to how the sensitive data is to be protected. As a result, IT organizations may no longer guarantee to be compliant with data protection laws, such as the European Union (EU) data protection regulations, the German "Bundesdatenschutzgesetz", or any other national or international data compliance rule.

There are different approaches how the "Shadow IT" might be controlled. One approach is to identify the usage of such cloud services by the enterprise, identify the access to and the usage of the sensitive data, and suppress the usage of the sensitive data through firewall rules and access policies. The problem is that constantly, new cloud services are being developed and as a consequence, one would always be a step behind exploiters of such new services. Furthermore, this would have to be an ongoing task, because as soon as one would stop ensuring security, someone could start making use of a new access path and new services, which would not be detected by the IT organization.

In the context of this description, the following conventions, terms and/or expressions may be used.

The term 'securely accessing' may denote a read, write or modify access to data that may underlie data policy rules pertaining to defined data security policies. The data policy rules may define entities who may have access to related secure or sensitive data, how the entities may be treated under an operation of an execution unit, and to which destinations the secure or sensitive data may be exported. The sensitive data may be masked (i.e., be unreadable or hidden) and/or encrypted before being transmitted over a network.

The term 'sensitive data' may denote data whose usage and access may underlie predefined data access rules and data access policies, and thus be treated as confidential against not allowed access. Beside sensitive data, also non-sensitive data may exist in a data center. Also for non-sensitive data, predefined data access policies may exist which may not be as restrictive as data access policies for sensitive data. A data access policy may define that only a predefined user may have access to the sensitive data, may alter/modify sensitive data, and/or delete sensitive data.

The term 'first computing environment' may denote a computing environment including typical elements of a data center, such as, inter alia, servers storage and network systems. The first computing environment may be an in-house data center of an enterprise, a data center which may be hosted by an outsourcer, or a data center of a cloud service provider. The protection of the data in the cloud service provider's data center may be implemented by a specific compliance gateway over which data may reach and leave the cloud service provider's data center.

The term 'operation' may denote a treatment of data which may modify the data. Typically, this may be performed by an execution unit of a processor of a computing system (real or virtual). Data may be added to or subtracted from the original data or may be modified in another sense. An operation may also denote a movement of data into another environment. Thus, a movement of a data field in a structured record into another data field of another structured record may also be denoted as operation.

The term 'external access' may denote an access to data from outside the first computing environment. If the first computing environment is an in-house data center, an export of data to an outside location, if compared to the data center, may denote an external access. If, in another case, the first computing environment is a data center of a cloud computing provider, an external access may denote an extraction of data out of the data center of the cloud computing provider. The cloud computing service provider may only deliver storage capabilities as well as computing capabilities being designed to modify any data.

The term 'sensitive data register or 'sensitive data register storage' may denote a specific data structure and/or memory system dedicated for tracking metadata and storage locations of sensitive data. The sensitive data register and the related storage may also be adapted to store information of an origin and/or source of data that may have been manipulated by an operation.

The term 'trusted data center' may denote a data center in which access to data stored in the data center underlies certain data access policies/rules. For example, data may not be accessed by anyone or anything but only by those entities being authorized to access certain data and/or sensitive data. Different rules of the data access policy may define fine-grained access to a plurality of data. In the context of an application, a trusted data center may be a synonym for the first computing environment.

The term 'cloud computing' may in one context be interpreted as a model for enabling convenient, on-demand network access to a shared pool of configurable computing resources (e.g., networks, servers, storage, applications, and services) that can be rapidly provisioned and released with minimal management effort or service provider interaction. One embodiment of a cloud model promotes availability and includes five characteristics, three service models and four deployment models.

Cloud computing includes characteristics of on-demand self-service, broad network access resource pooling, rapid elasticity, and measured service.

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, laptops, and PDAs).

Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported, providing transparency for both the provider and consumer of the utilized service.

Service models for cloud Computing used comprise Cloud Software as a Service, Cloud Platform as a Service, and Cloud Infrastructure as a Service.

Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise private cloud, community cloud, public cloud, and hybrid cloud.

Private cloud. The cloud infrastructure is operated solely by an organization. The private cloud may be managed by the organization or a third party and may exist on premise or off premise.

Community cloud. The cloud infrastructure is shared by several organizations and supports a specific community that has shared concerns (e.g., mission, security requirements, policy, and compliance considerations). The community cloud may be managed by the organizations or a third party and may exist on premise or off premise.

Public cloud. The cloud infrastructure is made available to the general public or a large industry group and is owned by an organization selling cloud services.

Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

Cloud software takes full advantage of the cloud paradigm by being service-oriented with a focus on statelessness, low coupling, modularity, and semantic interoperability.

A method of embodiments of the present invention for securely accessing sensitive data may offer the following advantages and technical effects.

Implementing the inventive method and/or the related system, IT operations may offer a way to protect sensitive data (e.g., for providers of cloud services). Cloud service providers may implement the system in order to ensure that users of such services handle data according to enterprise data security policies. Rules for how to treat sensitive data, which may be stored in a public cloud storage, may be uploaded to a cloud provider gateway to be applied for a specific data set belonging to an enterprise. Accordingly, uploaded rules may become part of the rules of the compliance firewall.

In one embodiment, the method may be applied to an in-house or on-premise data center where data may have to be protected and may not leave the data center or the enterprise without special permission. Additionally, the method and the related system may also be applied to a private cloud computing environment as well as a hybrid cloud computing environment. As part of the hybrid cloud computing environment, public cloud services or managed private cloud services may be used.

The rules as part of the compliance firewall, which may be managed by the compliance gateway, may define specific actions for specific sets of data depending on the related metadata. It may also be possible to define classes of sensitivity as part of the metadata such that these classes may be reflected by the rules, which may trigger different actions to the data depending on (a) the rule itself and (b) the sensitivity class conveyed by the related metadata.

Technically, the compliance gateway system may not transmit the data out of a related data center. Data may be encrypted before the data leaves the data center or computing environment via the gateway, or the data may be masked in a way that only certain data within a data set may be recognizable. If a data set comprises sensitive and non-sensitive data, the sensitive data may only become visible based on the rules defined as part of the compliance firewall.

Furthermore, a protection of data is possible for data that are derived from other sensitive data by a manipulation/modification or by creating new data derived from other sensitive data. In each case, the sensitivity information is consistent because the data is inherited. The method and system go even further to data protection mechanisms that tag sensitivity metadata to the data to be protected. In such a case, all applications dealing with the sensitive data would have to be modified in order to manage the sensitivity information. The method and system do not require such application modifications. The compliance gateway and compliance firewall rules prevent that sensitive data from being exported out of a secure computing environment. Thus, the correct rules ensure that a compliance with data security rules is met without modifying any application. Moreover, the rules of the compliance firewall may be changed at any time by authorized personnel, guaranteeing a proper handling of enterprise security rules.

Thus, a fine grained control of access rights to sensitive data may be applied by an enterprise owning the data. Certain data may be rejected by the first cloud computing environment according to rules as part of the compliance firewall. Thus, a user intending to send sensitive data to a public cloud computing environment may receive a warning or export of the sensitive data to the public cloud computing center may be prevented altogether.

FIG. 1 is a flow chart of a method 100 for securely accessing sensitive data stored in a first computing environment, in accordance with embodiments of the present environment. The method 100 includes receiving (step 102), data (e.g., encrypted data) by the first computing environment from a second computing environment which may be a client computing side. The data may include a mixture of non-sensitive data and sensitive data along with related metadata indicative of the sensitivity of the sensitive data. The metadata may identify: a user or group of users who may have access to the data; where the data may be stored; what application may manipulate/modify the data; and/or other data from which the data may been derived, in particular by an operation.

The method includes further performing (step 104) an operation on the sensitive data in the first computing environment by at least three steps, but not necessarily in this order: (a) determining (step 106) that the data used for the operation are sensitive data, in particular by inspecting the related or tagged metadata; (b) intercepting (step 108) the operation on the sensitive data; and (c) registering (step 110) newly created sensitive data as a result of the operation. The newly created metadata may indicate from which sensitive data or which mixture of sensitive and/or non-sensitive data the newly created sensitive data have been derived from.

Step 112 intercepts an external access approach to the sensitive data in the first computing environment by a compliance gateway. An action, in particular a compliance firewall rule, and eventually several compliance firewall rules, is applied (step 114) to the sensitive data intended to leave the first computing environment by the external access approach. It may be assumed that the sensitive data may only leave the first computing environment via a network attached to a gateway, in particular the compliance gateway. The network may be a wired network or a mobile network. The compliance firewall rule or rules may define one or more actions to the sensitive data before the sensitive data leaves the first computing environment. The one or more actions may be directed to encrypting the data, rejecting an access, e.g., by redirecting the access approach to another webpage displaying a message that the access is not granted, or by masking the data such that only portions of the data, in particular the data that are marked as accessible by the rule of the compliance firewall, may be visible to a user. In one embodiment, a user may also be another software program or process. Accordingly, the sensitive data may be protected against an unauthorized access approach.

According to one embodiment of the method, the sensitive data may be registered in a sensitive data register storage in the first computing environment. This registering of the sensitive data may be performed during a receiving of the data by the compliance gateway and/or by a hypervisor and/or in a combined action of the compliance gateway and the hypervisor. Thus, no sensitive data may be stored in the first computing environment without being registered in the sensitive data register storage. The sensitive data register storage may be a specially protected storage system with a dedicated access control.

According to one embodiment of the method, the metadata may also be indicative of a storage location of the sensitive data. Additionally, the storage location may also be registered in the sensitive data register storage in the first computing environment. Thus, it may always be known where sensitive data may be stored within the first computing environment. It may be controllable when and how sensitive data have entered the first computing environment, when sensitive data have been modified within the first computing environment, and when a copy of the sensitive data may have left the secure environment of the first computing environment.

According to an embodiment of the method, a hypervisor may be adapted to determine sensitive data, in particular by observing metadata associated to the sensitive data. The hypervisor may also be adapted to register the sensitive data or modifications to the sensitive data with the sensitive data register storage. Also light weight visualization systems, e.g., operating system virtualization using containers, may be supported by enhancing the system to act on the sensitive data register storage. A person of ordinary skill in the art will know that operating system virtualization achieves a virtualization by providing software containers which may provide environmental data such as libraries, specific metadata, configuration files, etc. for a dedicated application. Everything within a software container may be isolated against another software container. However, the operating system kernel may only exist once, and no hypervisor may be required for such sort of virtualization. Hence, the capability to maintain the sensitive data register storage may be integrated as a function or module into the operating system. This function may also be implemented into a dedicated hardware module usable by the operating system.

According to one embodiment of the method, newly created data may be marked sensitive if one operand of the operation is marked sensitive. By this mechanism, the sensitive status of data may not be diluted by a combination with non-sensitive data, and the associated metadata for the newly created data may include indications of the sources and a sensitivity status of original operands of an operation which may have created the new data within the first computing environment.

According to an embodiment of the method, operation in the first computing environment may be executed in a virtual computing environment. As mentioned above, a hypervisor together with the virtual machine and/or operating system virtualization may be used.

According to one embodiment of the method, the first computing environment may be a trusted data center, a hybrid cloud computing environment or a public cloud computing environment. A trusted data center may, e.g., be an in-house/on-premise data center of an enterprise. Alternatively, a trusted data center be a data center of an outsourcer managing the IT environment of the enterprise. Alternatively, the trusted data center may deploy a private cloud computing environment and/or a managed private cloud environment. Additionally, a public cloud computing environment may be regarded as a secure computing environment if the proposed methods and systems are implemented within such a public cloud computing environment. The provider of the public cloud computing environment may enhance its systems and computing environment by the mentioned compliance gateway together with a compliance firewall and at least one modified hypervisor as mentioned.

According to one embodiment of the method, the data received by the first computing environment may be received from a second computing environment. The second computing environment may be a client/customer computing environment using services of, e.g., a public cloud service. The second computing environment may also define the metadata of the related sensitive data and also which data may be treated as sensitive data. Different classes of sensitivity may be defined by the second computing environment before making the sensitive data available, in particular by sending the sensitive data to the first computing environment via a network, for example in an encrypted form, to the first computing environment via the compliance gateway of the first computing environment.

According to one embodiment of the method, the data received by the first computing environment and the data leaving the first computing environment, either sensitive or non-sensitive data, may be encrypted when traveling over a network. Gateways, between the first computing environment and a potential second computing environment, may enable such an encryption. Thus, neither sensitive nor non-sensitive data may be transmitted over a network in an unprotected way.

According to one embodiment of the method, an action may comprise encrypting the sensitive data, masking the sensitive data, and/or blocking the sensitive data. The action may be applied if certain conditions are met according to the compliance firewall rule. The action may require that the gateway encrypt data, before the data leaves the first computing environment, using a specific encryption key and/or encryption technology. The rules of the compliance firewall may trigger other actions: certain data in a set of sensitive data may be masked, by a dummy or default character for one or more characters or bytes of sensitive data, such that the sensitive data may be unreadable for an unauthorized user or system. Thus, the compliance firewall may define which user or system may have access, under which conditions (e.g., dependent on a time period, dependent on specific user or system metadata, or other combinations of conditions), to the sensitive data. Following an attempt to access the sensitive data, the request for accessing the sensitive data may be redirected; e.g., to a webpage indicating that an access of these specific sensitive data may not be granted to the requesting user or system. In other cases, the request for accessing the sensitive data for unauthorized users may be ignored. Alternatively, a sensitive data request alarm may be issued to data security personnel.

According to one embodiment of the method, the metadata may define a plurality of classes of sensitivity. Thus, sensitive data may not only be flagged as being sensitive by a 1-bit sensitivity flag or by the fact of having associated metadata, but the data may be classified in three or four or more different classes of sensitivity. Access to different classes of sensitivity may require different compliance firewall rules related to different actions in response to an attempt to access sensitive data of a certain class by a user or system being classified as having access to certain classes of sensitive data. In such a case, it may be ensured that the compliance gateway as well as the related hypervisor of the virtual computing environment of the first computing environment may be enabled to handle such classes of sensitivity. If one component may not be enabled to handle different classes of sensitivity of data, the data may again be classified as sensitive data (e.g., by a 1 bit sensitivity flag), and the actions treating the sensitive data intended to leave the first computing environment may be selected according to the strongest sensitivity class. The method may also include determining a class of sensitivity and a related value if newly created data are generated by an operation involving different classes of data. As a default, the more strict classification may be used for the result of an operation having one operand with a lower sensitivity class and the other operand with a higher sensitivity class.

Figure 2:
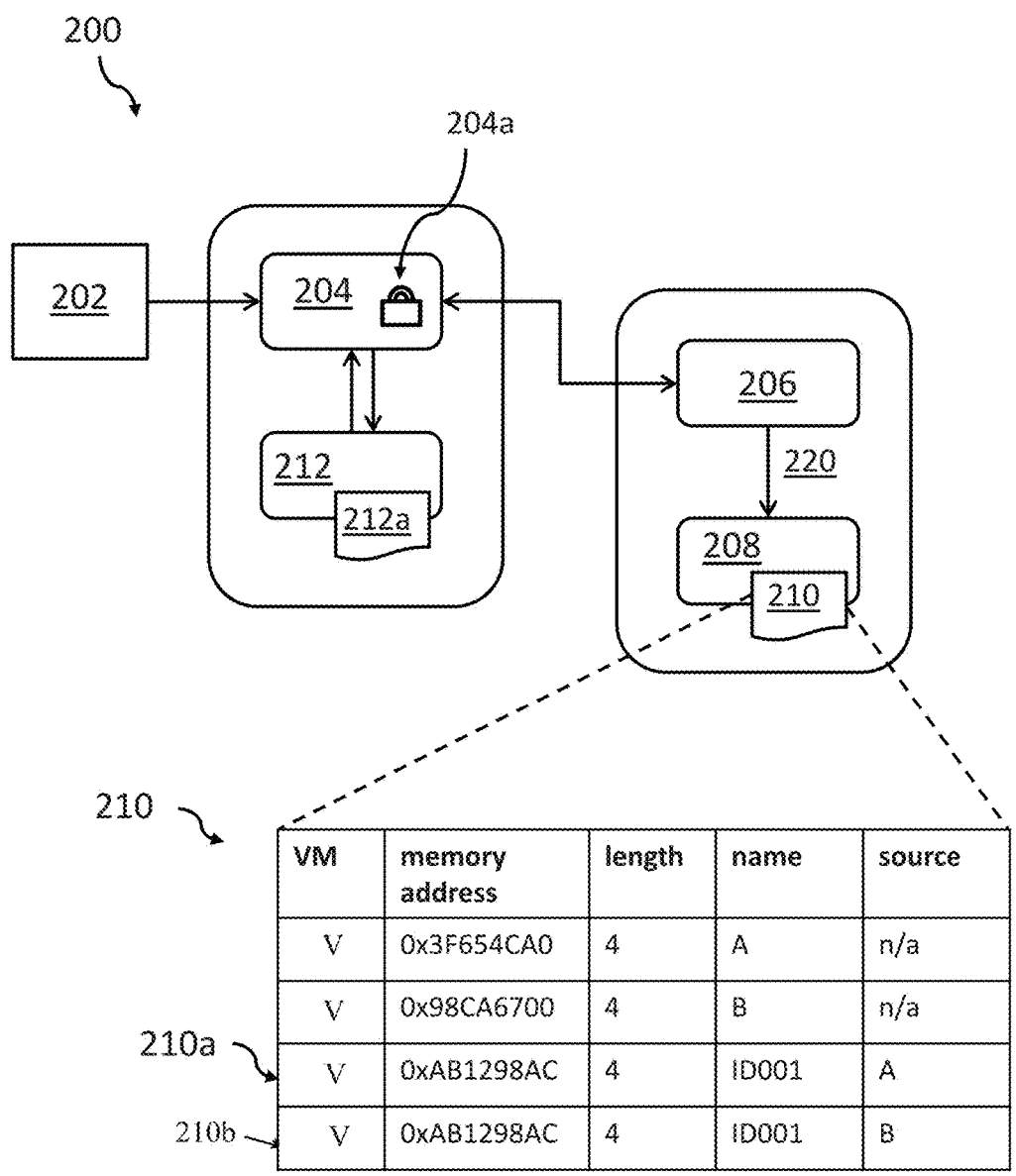
FIG. 2 shows a block diagram of elements for performing the method of FIG. 1, in accordance with embodiments of the present invention.

FIG. 2 shows a block diagram of elements 200 for performing the method 100 of FIG. 1, in accordance with embodiments of the present invention. Data may be sent from a user computer 202 or second computing environment 202 via a compliance gateway 204 including potentially required encryption keys 204a. The compliance gateway 204 may be connected to a guest operating system 206 running in the environment of a hypervisor 208. The hypervisor 208 is a communicative contact to the sensitive data register storage 210. The hypervisor 208 may intercept, 220, CPU and memory instructions of the guest system running on the hypervisor, in particular the guest operating system 206.

If an operation "C=A+B" should be performed by an application of the guest operating system 206, the hypervisor 208 intercepts (step 220) CPU and memory instructions. Accordingly, entries of metadata in the sensitive data register storage 210 may be filled by the hypervisor 208 or, in a cooperation between the compliance gateway 204 and hypervisor 208. As can be seen, for a virtual machine "V", which may correspond to the shown guest operating system 206, a memory location "0x3F654CA0", a length in number of bytes (here, 4 bytes), a name (here, "A" denoting the variable A whose value is in memory address "0x3F654CA0") and a source (here, not available) are stored in a first row of the sensitive data register storage 210. Other variables and exemplary values may be identified, by a person of ordinary skill in the art, in the sensitive data register storage 210. In case of the above mentioned operation "C=A+B", the third line and forth line of the exemplary sensitive data register storage 210 are pertinent. Here, the result of the operation "A+B" is given a new variable name "ID001" (compare, e.g., row 210a of the table in the sensitive data register storage 210) together with an indication of the source or sources "A" and/or "B" used to form the sum C computed as A+B. The rows 210a and 210b identify the same memory address "0xAB1298AC" containing the result C computed as the sum A+B, wherein row 210a and 210b identify the individual component A and B, respectively, used to form the sum C. More rows may be used for additional information; e.g., a sensitivity class of a certain data value.

In case of a request to the compliance gateway 204, the metadata information in FIG. 2 for each sensitive data value may then be used by the compliance gateway 204 in cooperation with the compliance firewall 212 which may include rules 212a defining specific actions for certain sensitive data before the sensitive data may be sent back to the requesting user 202 or application 202.

Figure 3:
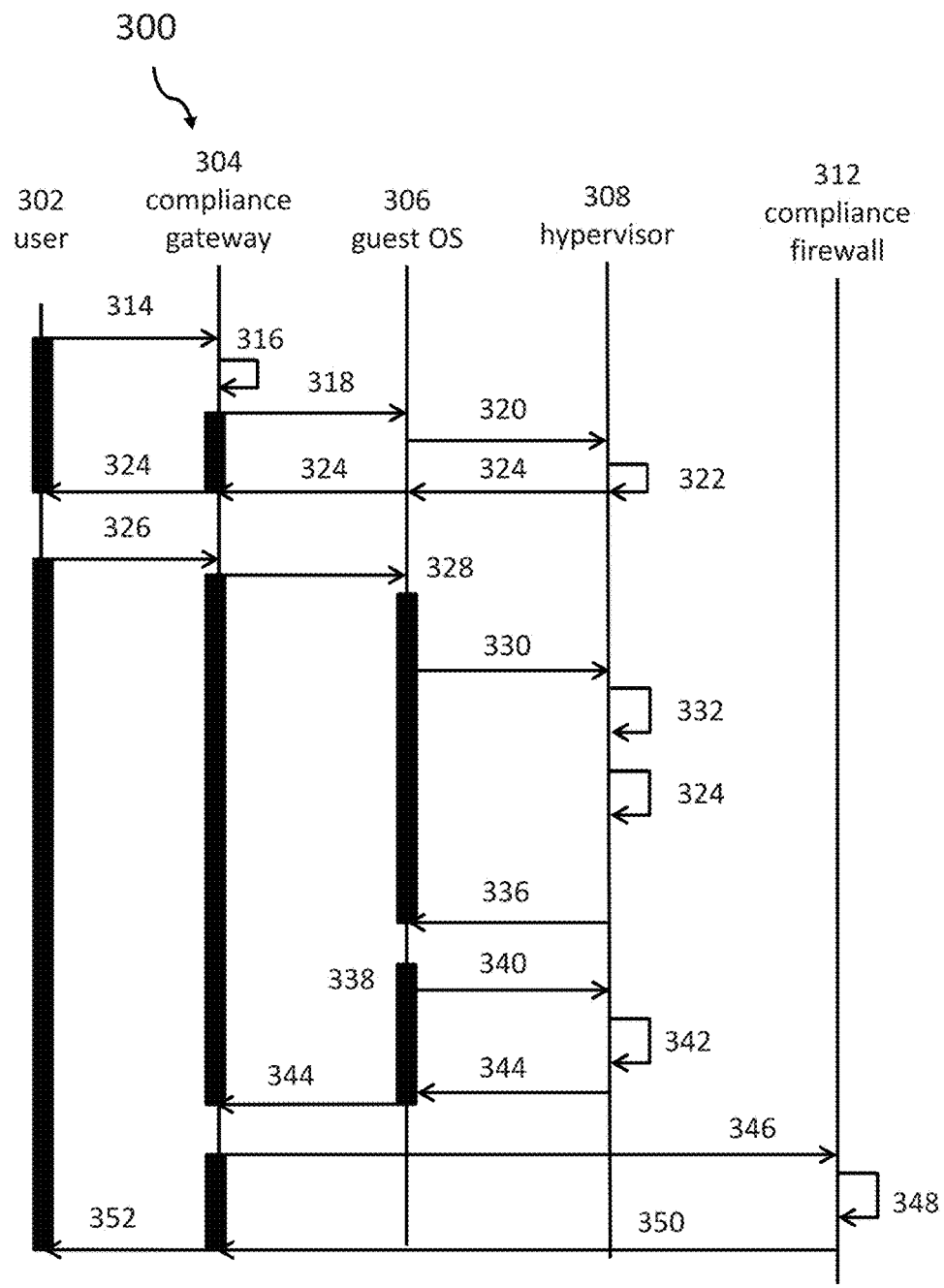
FIG. 3 shows a block diagram of a state diagram indicating different stages and involved elements when performing the method of FIG. 1, in accordance with embodiments of the present invention.

FIG. 3 shows a block diagram of a state diagram 300 indicating different stages and involved elements when performing the method 100 of FIG. 1, in accordance with embodiments of the present invention. Elements in FIG. 3 include: a user 302 or second computing environment 302, a compliance gateway 304, and a guest operating system 306 in a virtualized environment which may run on the hypervisor 308. In one embodiment, a sensitive data cloud processor (not shown) may be provided as well as the compliance firewall 312.

In one embodiment, the user 302 or a related application program is trying to exchange information with the first computing environment. The request sent (step 314) to the system contains sensitive data A and B. For illustrative purposes, A=3 and B=2. The gateway 304 may be located at any border of the controlled IT environment and will be set up to intercept an inbound and outbound traffic. The gateway 304 inspects the incoming network packets and may identify A and B as sensitive data (step 316). The gateway 304 may add metadata information, about the sensitive data (e.g., length, type, offset within the packet, name, etc.) contained in each packet, to the network packet and may send the network packet (step 318) to the guest operating system 306 in the controlled IT environment of the first computing environment. Here, the hypervisor 308, on which the virtual system runs, is intercepting (step 320) the incoming network packet. The hypervisor 308 then registers (step 322) the location of all contained sensitive data in a memory (the sensitive data register storage 210) of the virtual server. For example, the following information may be registered: an identifier of the virtual server in which the data is kept, a length of the sensitive data, a name (if the data entered the closed IT environment without modification), and a memory location where sensitive data are stored.

In one embodiment, a sensitivity class of the sensitive data may be registered.

The virtual server may then store received data in memory and return (step 324) a confirmation to the gateway 304 and then to the calling user 302 and/or application 302.

Next, the user 302 or application 302 may send (step 326) a new request to the first computing environment, which, e.g., performs (step 328) the mathematical operation (e.g., C=A+B) on previously sent sensitive data A and B. The gateway 304 may again intercept the request and may inspect the request, but may not find any sensitive data (and respective metadata) and therefore forward the request directly to the virtual system for execution. The virtual system with a guest operating system 306 analyzes the incoming request and tries to execute the requested operation C=A+B. The hypervisor 308 may then intercept (step 330), the CPU instruction because the hypervisor 308 detected that the sensitive data, namely, A and B, are accessed. The hypervisor 308 may support executing (step 332) the instruction (executed by the CPU or optionally, by a remote sensitive data cloud processor) and mark (step 334) the location of data C in the sensitive data register storage 210 together with information that was derived from sensitive data A and B. The hypervisor 308 may not have access to the information and would therefore register the new sensitive data C with an internal ID, e.g., ID001, in the sensitive data registry storage 210. Then, the guest operating system 306 may continue (step 336) operation of the method.

In step 338, the virtual server or guest operating system 306 tries to send the resulting data C back to the requester (user and/or application 302). The hypervisor 308 intercepts (step 340) the network request because of the sensitive data ID001. Metadata information about C may be added to the network packet (step 342); e.g., length, type, offset within the packet, name, and information derived from sensitive data A and B. The packet may then be sent (step 344) to the compliance gateway 304.

The compliance gateway 304 inspects outgoing data traffic and detects that the sensitive data with ID001 is contained in the data packet. The compliance gateway 304 therefore either forwards (step 346) the data packet to the compliance firewall 312, or treats (step 346) the data packet according to the compliance firewall 312 rules directly. According to the rule or set of rules of the compliance firewall 312, an action for treating sensitive data, in this case called ID001, may be applied (step 348). If nothing specific is found within the rule or rules for an application of the action defined by the rule or rules, the compliance firewall 312 returns (step 350), the packet back to the compliance gateway 304, in response to which the compliance gateway 312 returns (step 352) the requested packet back to the calling user and/or application 302.

As discussed, the compliance firewall 312 will receive rules and policies, as does a typical network firewall, from a rule file. However, unlike the network firewall, the compliance firewall 312 does not operate on the network connection level (watching which server or subnet wants to communicate with which server/subnet over which port and/or protocol), but rather on a data level, which allows a security and compliance office of an IT organization to define rules and policies of how sensitive data, and sensitive data derived from other sensitive data, are handled.

In one embodiment, rules have respective identifiers used to identify an order in which the rules for the same sensitive data are applied.

In one embodiment, a rule may specify sensitive data to which the rule is applicable.

In one embodiment, a rule is valid only for non-derived data and also for any sensitive data derived from the non-derived data.

In one embodiment, a rule is applied only if the data is coming from specified servers/subnets or going to specified servers/subnets.

In one embodiment, an operation is to be performed if a rule is satisfied. Examples of such an operation include, inter alia: masking sensitive data or specified values of sensitive data, rejecting a request to access the sensitive data, performing no action at all, and redirecting the request to access sensitive data to a predefined universal resource locator (URL). In one embodiment, a rule may apply to information about a requestor of certain data; e.g., a requestor class categorizing different requestors to redefined requestor classes. In one embodiment, a rule may combine conditions based on sensitive data with a condition regarding requestors of the sensitive data.

The following example explains an inheriting of a sensitivity status of data. In this example, C=A+B is assumed, and the following first rule and second rule are used.

First Rule
variable ID 1
name of variable A
apply action to derived data? no
target dropbox.com
action reject
Second Rule
variable ID 2
name of variable B
apply action to derived data? yes
target dropbox.com
action redirect to http://mycompany.com/dropbox-not allowed.html In the above example, the compliance firewall would be triggered for sensitive data "ID001" representing C, which may be derived from "A" and "B". There is no rule for "ID001" explicitly, but rather for "A" and "B". However, the rule for "A" is applied only for the data "A" itself and not for a variable derived from "A". But the rule for "B" is applied to any data derived from "B", such as "ID001". The data request to get a result of "C=A+B" is therefore redirected to a URL showing an error message stating that the operation of C=A+B is not allowed by the company's policies since the "redirect" action is applied to the derived data C.

Thus, an IT security office of an enterprise may use the novel compliance firewall of embodiments of the present invention to easily define policies for all known and classified sensitive data and any derivatives from the sensitive data. In addition, rules and policies may be specified per cloud service so that the usage of cloud services may be controlled in a flexible way, such as: to grant the usage of specific, not trusted cloud services in a flexible way unless the cloud services contain sensitive data; and to reject the usage of defined, not trusted cloud services or at least mask sensitive data in the cloud services, such as with file sharing services; e.g., Dropbox (which is only an example for a large group of potentially unsecure data sharing services). The secure accessing mechanism to sensitive data may be operated on a data level based on metadata associated with sensitive data instead of a connection based security mechanism. Such a connection based security mechanism may be combined with connection based security mechanisms, such as a redirecting operation on sensitive data by a sensitive data processor in a different environment together with an encryption of the associated data on the way to and back from the sensitive data processor. In that case, the above-mentioned support of the hypervisor 308 to execute (step 332) the exemplary operation (C=A+B) may be implemented in a way of sending relevant data (here, A and B) to a sensitive data processor, which may be operated in a secure environment and returning a result of the securely executed operation back to the requesting hypervisor 308 and/or guest operating system 306.

However, this may additionally enhance the security of the operation. But due to the fact that a method of embodiments of the present invention operates on a data level, the additional step of having the operation performed by a sensitive data processor may not be required.

Figure 4:
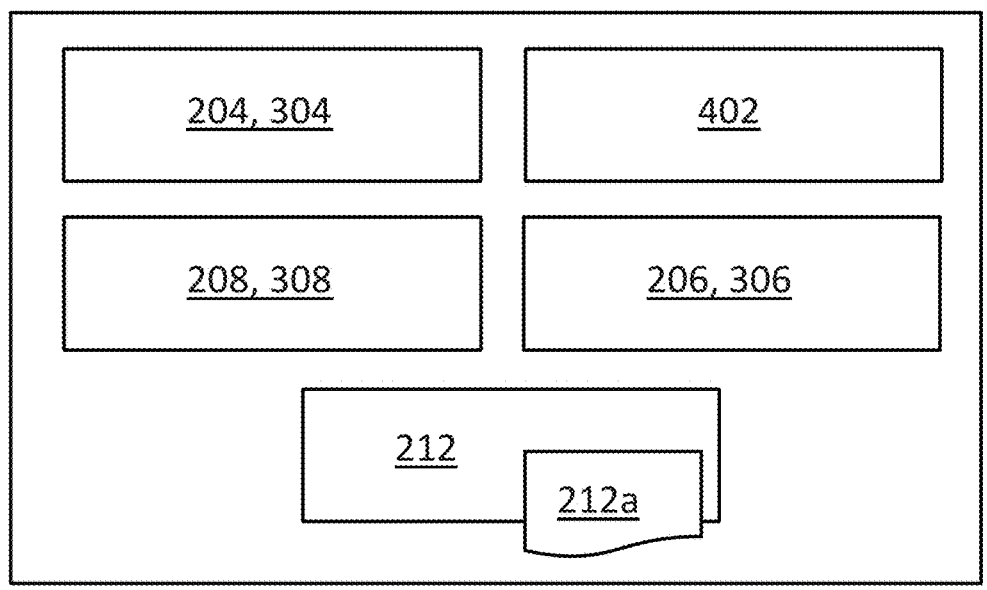
FIG. 4 shows an embodiment of an inventive compliance system for enabling securely accessing sensitive data stored in a computing environment, in accordance with embodiments of the present invention.

FIG. 4 shows an embodiment of an inventive compliance system 400 for enabling securely accessing sensitive data stored in a first computing environment, in accordance with embodiments of the present invention. The compliance system 400 includes a compliance gateway 204, 304 adapted for a reception of data by the first computing environment, wherein the data includes a mixture of non-sensitive data and sensitive data along with related metadata indicative of the sensitivity.

An execution unit 402 (e.g., implemented by the hypervisor 208, 308 and used by the guest operating system 206, 306) may be configured to perform an operation on the sensitive data in the first computing environment. The execution unit 402 may also be configured to (a) determine that the data used for the operation are sensitive data, (b) intercept the operation on the sensitive data, and (c) register newly created sensitive data, as a result of the operation, with metadata in sensitive data register storage 210 indicating one or more memory addresses of the sensitive data.

The compliance gateway 204, 304 is configured to accept an external access to the sensitive data in the first computing environment, and to apply a compliance firewall rule 212a of a compliance firewall 212 to the sensitive data intended to leave the first computing environment. The compliance firewall rule 212a may define an action to the sensitive data such that the sensitive data are protected against unauthorized access.

Figure 5:
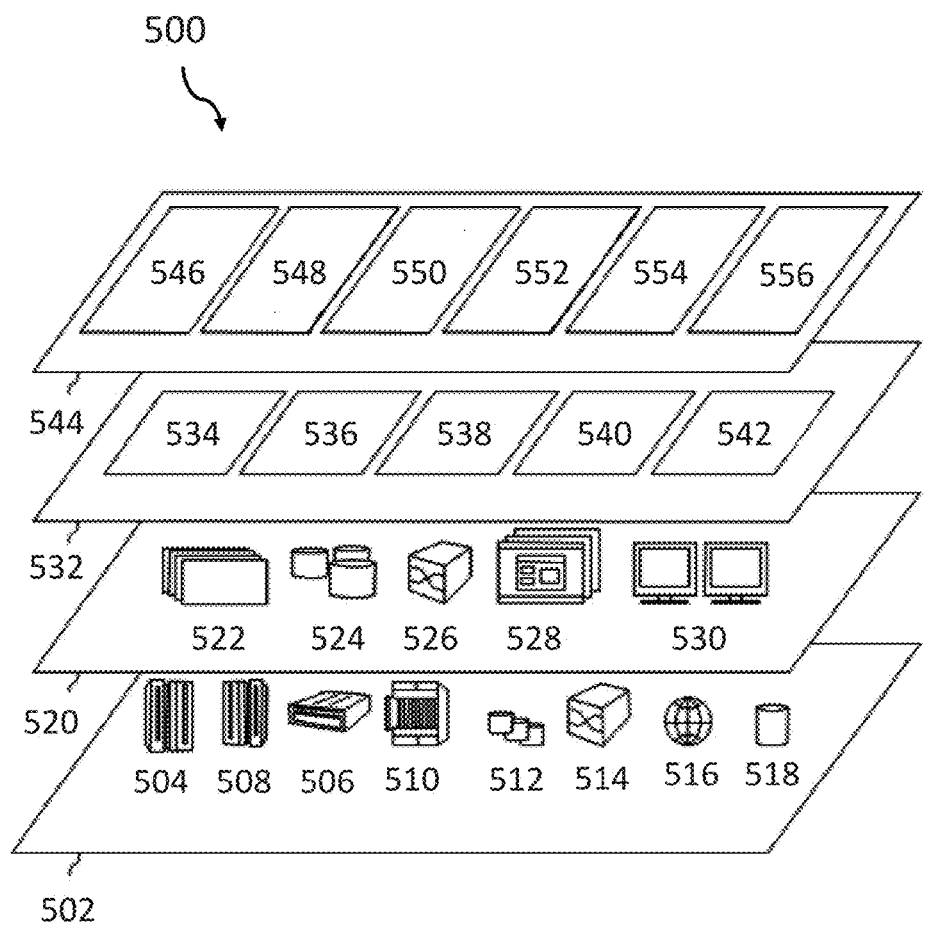
FIG. 5 shows a cloud computing environment in which the present invention may be deployed, in accordance with embodiments of the present invention.

FIG. 5 shows a cloud computing environment 500 in which the present invention may be deployed, in accordance with embodiments of the present invention. A set of functional abstraction layers provided by cloud computing environment is shown. It should be understood in advance that the components, layers, and functions shown in FIG. 5 are intended to be illustrative only and embodiments of the present invention are not limited thereto. As depicted in FIG. 5, hardware and software layer 502 includes hardware and software components. Examples of hardware components include: mainframes 504; servers 506; RISC (Reduced Instruction Set Computer) architecture based servers 508; Blade servers 510; storage devices 512; networks and networking components 514. In some embodiments, software components include network application server software 516 and/or database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 532 may provide the functions described below. Resource provisioning 534 provides dynamic procurement of computing resources and other resources that are utilized to perform tasks within the cloud computing environment. Metering and Pricing 536 provide: cost tracking as resources are utilized within the cloud computing environment; and billing or invoicing for consumption of these resources. In one example, the resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provides pre-arrangement for, and procurement of, cloud computing resources for which a future requirement is anticipated in accordance with an SLA.

Workloads layer 544 provides examples of functionality for which the cloud computing environment may be utilized. Examples of workloads and functions which may be provided from layer 544 include: mapping and navigation 546; software development and lifecycle management 548; virtual classroom education delivery 550; data analytics processing 552; transaction processing 554; and the monitoring function 556.

Embodiments of the present invention may be implemented together with virtually any type of computer, regardless of the platform being suitable for storing and/or executing program code as long as the specific hardware implemented function and features mentioned may be integratable.

Figure 6:
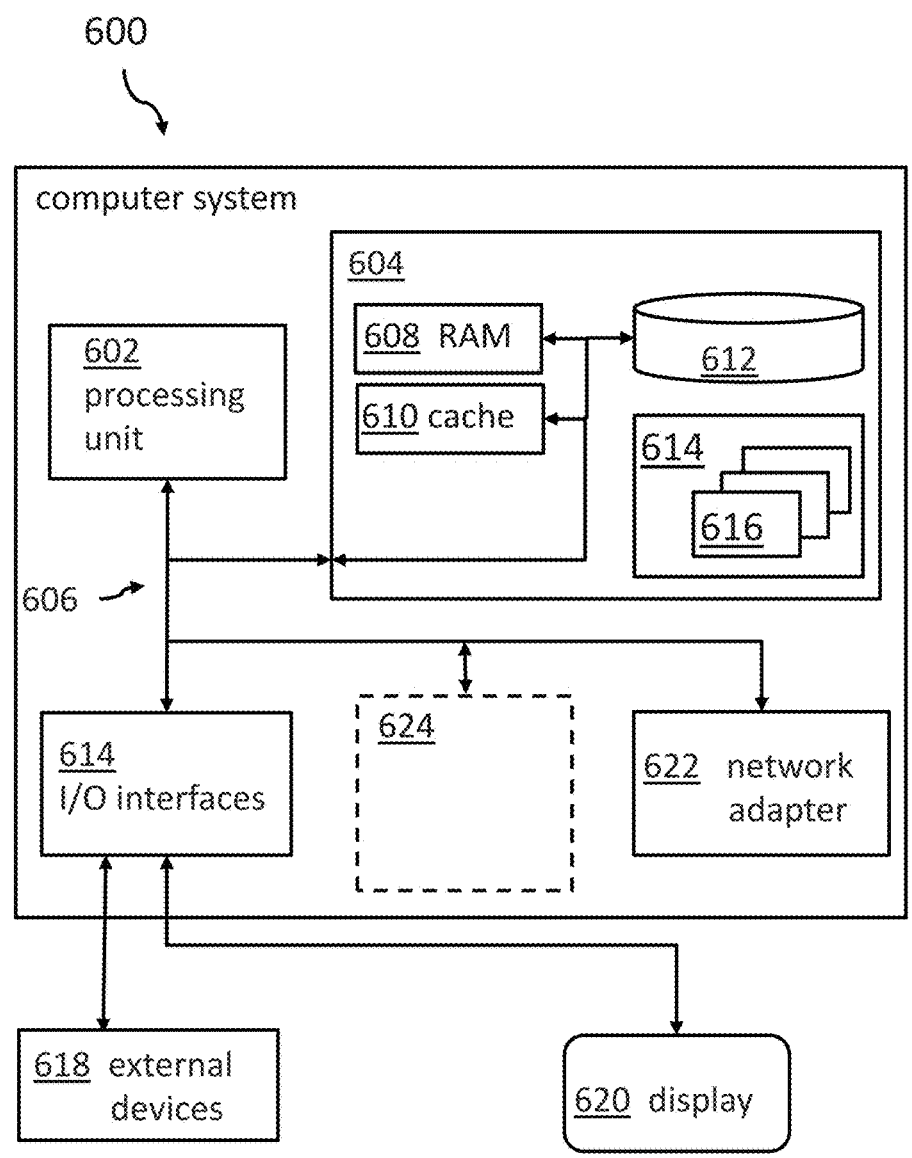
FIG. 6 shows a computing system for executing program code, in accordance with embodiments of the present invention.

FIG. 6 shows a computing system 600 suitable for executing program code in accordance with embodiments of the present invention. Special functions may be performed by dedicated hardware implementations.

The computing system 600 represents or comprises any computer system used in the present invention (e.g., first computing environment, second computing environment, etc.).

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

Program/utility 614, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

It may also be noted that the computing system 600 may also comprise the compliance gateway 204, the sensitive data register 210, storage for the compliance firewall rule, and the compliance firewall 212. All of this may be marked by reference numeral 624.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

A computer program product of the present invention comprises one or more computer readable hardware storage devices having computer readable program code stored therein, said program code containing instructions executable by one or more processors of a computing system to implement the methods of the present invention.

A computing system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:

receiving, by a first computing environment from a second computing environment via one or more processors of the first computing environment, data wherein the received data comprises a mixture of non-sensitive data and first sensitive data along with first metadata indicative of a sensitivity of the first sensitive data, and wherein the second computing environment is external to the first computing environment;

receiving, by the one or more processors from the second computing environment, a request to perform an operation on the previously received first sensitive data;

after said receiving the request to perform the operation, ascertaining, by the one or more processors by inspecting the first metadata, that the first sensitive data to be used for the operation are sensitive data;

in response to said ascertaining, intercepting, by the one or more processors, the operation on the first sensitive data;

after said intercepting the operation on the first sensitive data, performing, by the one or more processors, the operation on the first sensitive data, wherein said performing the operation on the first sensitive data creates second sensitive data resulting from said performing the operation on the first sensitive data;

registering the created second sensitive data by storing one or more memory addresses of the second sensitive data in second metadata and storing the second metadata in a sensitive data register storage; and intercepting, by the one or more processors, an external access by the second computing environment of the second sensitive data in the first computing environment and in response, applying a compliance firewall rule to the second sensitive data intended to leave the first computing environment, wherein the compliance firewall rule defines an action to be applied to the second sensitive data such that the second sensitive data are protected against unauthorized access, wherein the first computing environment comprises a hypervisor, a virtual machine running on the hypervisor and comprising the sensitive data register storage, and a compliance gateway coupled to and external to the virtual machine and the hypervisor, and wherein the hypervisor, the virtual machine, and the compliance gateway are utilized in performance of said receiving the data, and wherein the method further comprises after said receiving the request:

said compliance gateway intercepting the request;

said compliance gateway inspecting the intercepted request, not finding sensitive data in the request from said inspecting the intercepted request, and forwarding the request directly to the virtual machine in response to said not finding sensitive data in the request;

said virtual machine receiving the request from the compliance gateway and in response, said virtual machine initiating performance of the operation indicated in the request; and said hypervisor determining that the performance of the request requires the first sensitive data that is sensitive, and in response said hypervisor preventing the virtual machine from completing performance of the operation by performing said intercepting the operation.

2. The method of claim 1, wherein the first computing environment is selected from the group consisting of: a trusted data center, a hybrid cloud computing environment, and a public cloud computing environment.

3. The method of claim 1, wherein the action is selected from the group consisting of: encrypting the second sensitive data, masking the second sensitive data, and blocking the second sensitive data.

4. A computer program product, comprising one or more computer readable hardware storage devices having computer readable program code stored therein, said program code containing instructions executable by one or more processors of a first computing environment to implement a method, said method comprising:

receiving, by the first computing environment from a second computing environment via the one or more processors, data wherein the received data comprises a mixture of non-sensitive data and first sensitive data along with first metadata indicative of a sensitivity of the first sensitive data, and wherein the second computing environment is external to the first computing environment;

receiving, by the one or more processors from the second computing environment, a request to perform an operation on the previously received first sensitive data;

after said receiving the request to perform the operation, ascertaining, by the one or more processors by inspecting the first metadata, that the first sensitive data to be used for the operation are sensitive data;

in response to said ascertaining, intercepting, by the one or more processors, the operation on the first sensitive data;

after said intercepting the operation on the first sensitive data, performing, by the one or more processors, the operation on the first sensitive data, wherein said performing the operation on the first sensitive data creates second sensitive data resulting from said performing the operation on the first sensitive data;

registering the created second sensitive data by storing one or more memory addresses of the second sensitive data in second metadata and storing the second metadata in a sensitive data register storage; and intercepting, the one or more processors, an external access by the second computing environment of the second sensitive data in the first computing environment and in response, applying a compliance firewall rule to the second sensitive data intended to leave the first computing environment, wherein the compliance firewall rule defines an action to be applied to the second sensitive data such that the second sensitive data are protected against unauthorized access, wherein the first computing environment comprises a hypervisor, a virtual machine running on the hypervisor and comprising the sensitive data register storage, and a compliance gateway coupled to and external to the virtual machine and the hypervisor, and wherein the hypervisor, the virtual machine, and the compliance gateway are utilized in performance of said receiving the data, and wherein the method further comprises after said receiving the request:

said compliance gateway intercepting the request;

said compliance gateway inspecting the intercepted request, not finding sensitive data in the request from said inspecting the intercepted request, and forwarding the request directly to the virtual machine in response to said not finding sensitive data in the request;

said virtual machine receiving the request from the compliance gateway and in response, said virtual machine initiating performance of the operation indicated in the request; and said hypervisor determining that the performance of the request requires the first sensitive data that is sensitive, and in response said hypervisor preventing the virtual machine from completing performance of the operation by performing said intercepting the operation.

5. A computing system, comprising a first computing environment, said first computing environment comprising one or more processors, one or more memories, and one or more computer readable hardware storage devices, said one or more hardware storage device containing program code executable by the one or more processors via the one or more memories to implement a method, said method comprising:

receiving, by the first computing environment from a second computing environment via the one or more processors, data wherein the received data comprises a mixture of non-sensitive data and first sensitive data along with first metadata indicative of a sensitivity of the first sensitive data, and wherein the second computing environment is external to the first computing environment;

receiving, by the one or more processors from the second computing environment, a request to perform an operation on the previously received first sensitive data;

after said receiving the request to perform the operation, ascertaining, by the one or more processors by inspecting the first metadata, that the first sensitive data to be used for the operation are sensitive data;

in response to said ascertaining, intercepting, by the one or more processors, the operation on the first sensitive data;

after said intercepting the operation on the first sensitive data, performing, by the one or more processors, the operation on the first sensitive data, wherein said performing the operation on the first sensitive data creates second sensitive data resulting from said performing the operation on the first sensitive data;

registering the created second sensitive data by storing one or more memory addresses of the second sensitive data in second metadata and storing the second metadata in a sensitive data register storage; and intercepting, the one or more processors, an external access by the second computing environment of the second sensitive data in the first computing environment and in response, applying a compliance firewall rule to the second sensitive data intended to leave the first computing environment, wherein the compliance firewall rule defines an action to be applied to the second sensitive data such that the second sensitive data are protected against unauthorized access, wherein the first computing environment comprises a hypervisor, a virtual machine running on the hypervisor and comprising the sensitive data register storage, and a compliance gateway coupled to and external to the virtual machine and the hypervisor, and wherein the hypervisor, the virtual machine, and the compliance gateway are utilized in performance of said receiving the data, and wherein the method further comprises after said receiving the request:
said compliance gateway intercepting the request;
said compliance gateway inspecting the intercepted request, not finding sensitive data in the request from said inspecting the intercepted request, and forwarding the request directly to the virtual machine in response to said not finding sensitive data in the request;
said virtual machine receiving the request from the compliance gateway and in response, said virtual machine initiating performance of the operation indicated in the request; and
said hypervisor determining that the performance of the request requires the first sensitive data that is sensitive, and in response said hypervisor preventing the virtual machine from completing performance of the operation by performing said intercepting the operation.

6. The method of claim 1, wherein said receiving the data comprises:
said compliance gateway receiving a network packet comprising the data;
said compliance gateway adding metadata information about the first sensitive data to the network packet and subsequently sending the network packet to the virtual machine;
said hypervisor intercepting the network packet sent to the virtual machine; and
after said intercepting the network packet, said hypervisor registering information pertaining to the first sensitive data in the sensitive data register storage.

7. The method of claim 6, wherein said registering the information pertaining to the first sensitive data comprises:
registering, in the sensitive data register storage, an identifier of the virtual machine, a length of the sensitive data, a memory location of the virtual machine where the first sensitive data are stored, and a sensitivity class of the sensitive data.

8. The method of claim 1, wherein the method further comprises after said intercepting the operation:
said hypervisor facilitating said performing the operation;
said hypervisor performing said registering the created second sensitive data;
after said registering the created second sensitive data, said hypervisor sending the second sensitive data to the compliance gateway; and
said compliance gateway receiving the second sensitive data, determining that the second sensitive data is sensitive and in response, said compliance gateway performing said intercepting the external access of the second sensitive data.

9. The computer program product of claim 4, wherein said receiving the data comprises:
said compliance gateway receiving a network packet comprising the data;
said compliance gateway adding metadata information about the first sensitive data to the network packet and subsequently sending the network packet to the virtual machine;
said hypervisor intercepting the network packet sent to the virtual machine; and
after said intercepting the network packet, said hypervisor registering information pertaining to the first sensitive data in the sensitive data register storage.

10. The computer program product of claim 9, wherein said registering the information pertaining to the first sensitive data comprises:
registering, in the sensitive data register storage, an identifier of the virtual machine, a length of the sensitive data, a memory location of the virtual machine where the first sensitive data are stored, and a sensitivity class of the sensitive data.

11. The computer program product of claim 4, wherein the method further comprises after said intercepting the operation:
said hypervisor facilitating said performing the operation;
said hypervisor performing said registering the created second sensitive data;
after said registering the created second sensitive data, said hypervisor sending the second sensitive data to the compliance gateway; and
said compliance gateway receiving the second sensitive data, determining that the second sensitive data is sensitive and in response, said compliance gateway performing said intercepting the external access of the second sensitive data.

12. The computing system of claim 5, wherein said receiving the data comprises:
said compliance gateway receiving a network packet comprising the data;
said compliance gateway adding metadata information about the first sensitive data to the network packet and subsequently sending the network packet to the virtual machine;
said hypervisor intercepting the network packet sent to the virtual machine; and
after said intercepting the network packet, said hypervisor registering information pertaining to the first sensitive data in the sensitive data register storage.

13. The computing system of claim 12, wherein said registering the information pertaining to the first sensitive data comprises:
registering, in the sensitive data register storage, an identifier of the virtual machine, a length of the sensitive data, a memory location of the virtual machine where the first sensitive data are stored, and a sensitivity class of the sensitive data.

14. The computing system of claim 5, wherein the method further comprises after said intercepting the operation:
said hypervisor facilitating said performing the operation;
said hypervisor performing said registering the created second sensitive data;
after said registering the created second sensitive data, said hypervisor sending the second sensitive data to the compliance gateway; and
said compliance gateway receiving the second sensitive data, determining that the second sensitive data is sensitive and in response, said compliance gateway performing said intercepting the external access of the second sensitive data.

* * * * *